Aug. 15, 1967  K. H. FRANTZEN  3,335,518
CROP GROWTH IMPROVEMENT BY MEANS OF PROPANE ACTUATED
THERMOPILE AND INSECTICIDE VOLATILIZER
Original Filed Aug. 19, 1963  2 Sheets-Sheet 1
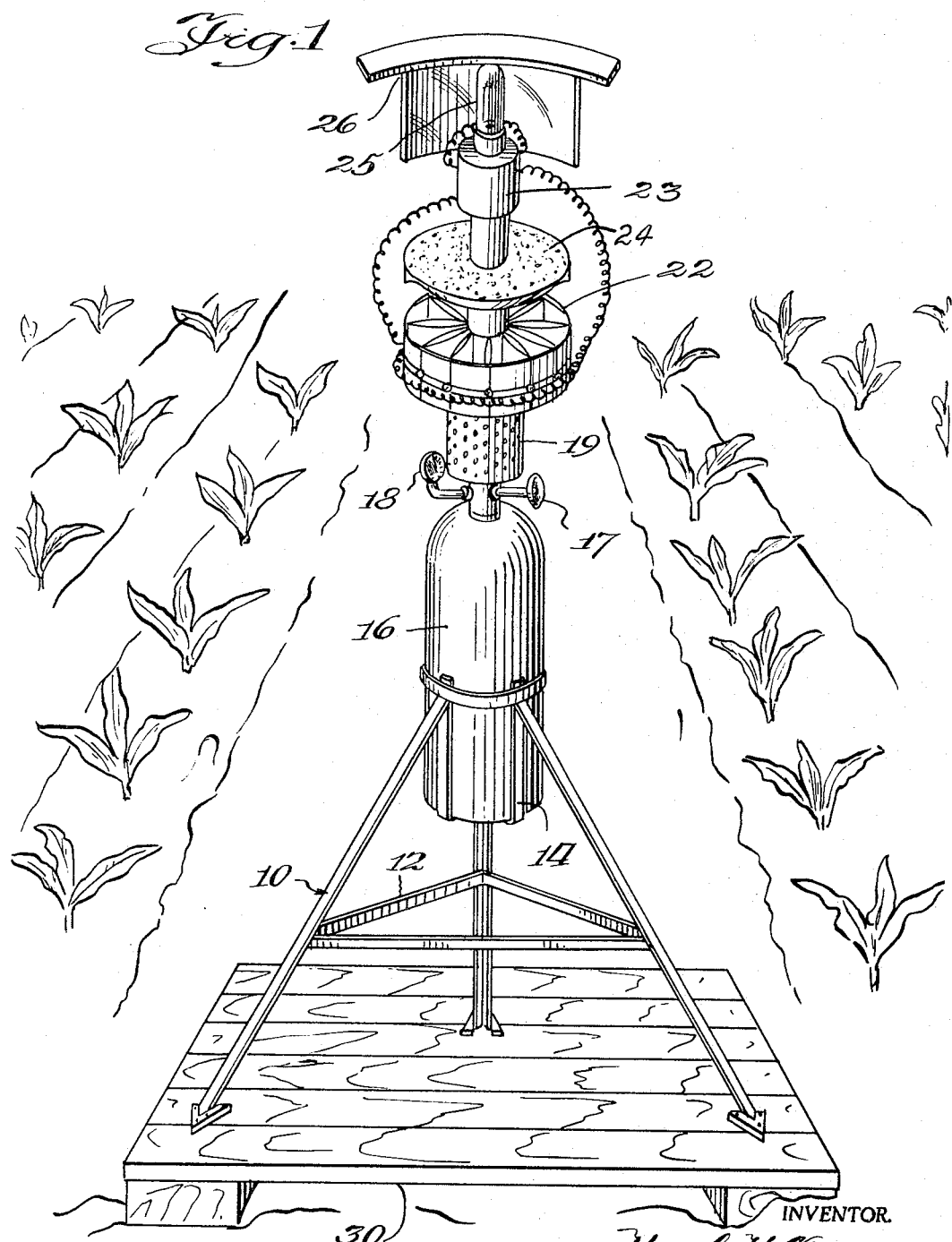
INVENTOR.
Karl H. Frantzen
BY
Merriam, Marshall, Shapiro & Klose
Attorneys Aug. 15, 1967  K. H. FRANTZEN  3,335,518
CROP GROWTH IMPROVEMENT BY MEANS OF PROPANE ACTUATED
THERMOPILE AND INSECTICIDE VOLATILIZER
Original Filed Aug. 19, 1963  2 Sheets-Sheet 2
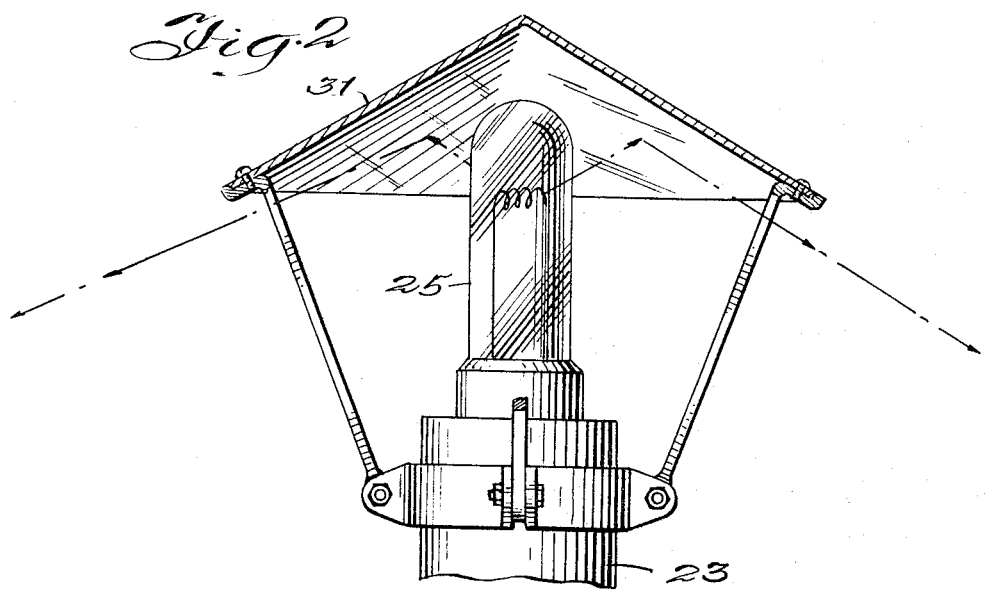
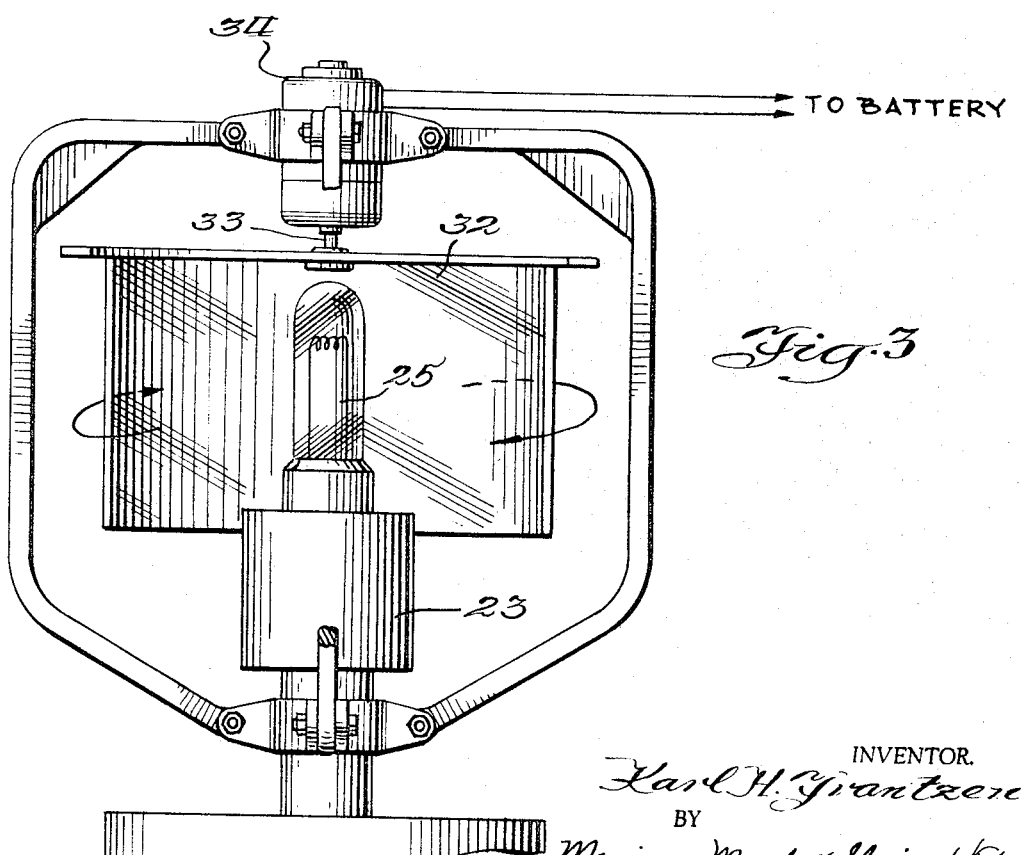

United States Patent Office 3,335,518
Patented Aug. 15, 1967

3,335,518
CROP GROWTH IMPROVEMENT BY MEANS OF PROPANE ACTUATED THERMOPILE AND INSECTICIDE VOLATILIZER
Karl H. Frantzen, Omaha, Nebr., assignor to Northern Gas Products Company, Omaha, Nebr., a corporation of Delaware
Original application Aug. 19, 1963, Ser. No. 303,056. Divided and this application July 11, 1966, Ser. No. 578,910
5 Claims. (Cl. 43—129)

This is a divisional of Karl H. Frantzen application S.N. 303,056, filed Aug. 19, 1963.

This invention relates generally to an improved method of growing corn grain and other crops through the use of a propane operated fuel cell which flashes intermittent beams of radiant energy.

The farmer, in growing food crops, e.g., corn grain, is continually confronted with an increased per acre cost accrued in the production of a particular crop yield per acre. Were the farmer able to maintain a relatively constant production cost while increasing his corn grain yield per acre, his overall profit would increase. It is the intention of the present invention to increase this crop yield without a substantial increase in cost of crop production.

In the growth of crops, photosynthesis occurs. This is a process whereby carbohydrates are synthesized from carbon dioxide in water by means of chloroplasts of living cells in the presence of light with oxygen being a by-product. The chemical expressions for this process can be stated:

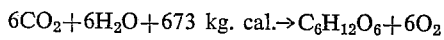

$$6CO_2 + 6H_2O + 673 \text{ kg. cal.} \rightarrow C_6H_{12}O_6 + 6O_2$$

An analysis of the energy requirements to produce photosynthesis in corn production has resulted in the following:

Energy required for the synthesis of 1 kg. of glucose _____ kg. cal__ 3,760
Total energy utilized in photosynthesis by an acre of corn plants in the manufacture of 8,732 kg. glucose _____ kg. cal__ 33M
Total solar energy available on an acre during the growing season _____ kg. cal__ 2,043
Percent of available energy used by corn plant in photosynthesis, namely its photosynthetic efficiency _____ 1.6%

Since in a typical corn crop, the bulk is harvested as grain, a 100 bushel per acre yield would represent approximately 25% of the total carbohydrates formed. An evaluation of this yield in light of the above table discloses that the efficiency of the radiant energy used for the production of corn grain is reduced to approximately 0.4% of the total solar energy available. If the efficiency of the radiant energy were increased from 0.4% to even 0.5%, there would result a 25 bushel increase in corn grain per acre of corn crop.

It has been determined that when flashes of light are interrupted by periods of darkness, the photosynthetic yield on Chlorella specimens per unit of light is 400% greater than continuous light. Thus, products of light reaction form faster than they can be used under continuous light, whereas under intermittent light, the dark reaction can utilize the products formed by light reactions more efficiently, thus increasing the photosynthetic output.

During the periods when continuous light is present, carbohydrates, made from the reduction of carbon dioxide and water under the influence of chlorophyll and radiant energy, are produced faster than they can be utilized such that a flooding of this product occurs in the structure of the plant. However, when the radiant energy is supplied intermittently having light periods in which the products are produced and dark periods wherein they are utilized in the plant itself, the flooding is minimized, with the overall effect being that the conversion of energy to carbohydrates is increased.

Conversion of the data submitted in the above table discloses the radiant energy required to produce a 56 lb. bushel of corn grain is 1,390,600 B.t.u.'s. Based on a photosynthetic yield efficiency of approximately 400% for intermittent versus continuous light, 3,274 B.t.u.'s are required to produce one bushel of corn grain.

To furnish the necessary fuel requirements set forth above presents a number of problems. It is imperative that the fuel apparatus be designed for mobility from one crop area to another. In addition, the unit should incorporate its own fuel supply, thus alleviating any need for gas lines or electrical conduit lines leading to some distant power source. I have discovered that a propane actuated thermopile is a suitable and economical apparatus for providing the radiant energy requirements. The thermopile, a thermo electrical device, is capable of producing a required low voltage current by the conversion of heat energy to electrical energy. This is accomplished by the use of dissimilar materials constructed such that one junction of the materials is heated while the temperature of the remaining junction is fixed or cooled, the effect of which is to cause a current to flow. A condenser is used to store electrical energy produced from the thermopile to a sufficient level so that an attached flash tube may convert the electrical energy into an intermittent source of radiant energy. The fuel supply for the unit is bottled propane which can readily be replaced upon depletion. Moreover, the use of bottled propane allows the apparatus to be extremely compact and mobile.

FIGURE 1 is a view of the apparatus for producing an intermittent source of radiant energy;

FIGURE 2 is a further embodiment of the deflecting means shown in FIGURE 1; and

FIGURE 3 is also a further embodiment of the deflector means showing a power driven radiant energy deflector means.

Referring to the drawings, the apparatus for producing a source of intermittent radiant energy consists of a triangular supporting stand 10 having legs 11 and support braces 12. The support stand is attached in any suitable manner to a carrier 30 which san be readily moved to any desired location in a field of crops. One end of each of legs 11 is suitably attached, e.g., by welding or a bolt and nut arrangement, to an adjustable tank retaining ring 13. Depending from ring 13 are legs 14, one portion of each leg 14 being bent substantially 90°, the bent end being attached to a base plate (not shown). Legs 14 and the base plate act as a holding means for a tank or bottle 16 of propane fuel. At the neck of tank 16, regulating valve 17 and pressure gauge 18 are located. In combustion chamber 19 the propane, or other suitable fuel, is converted to heat energy which is used to heat junction 20 of thermopile 21, junction 20 consisting of two dissimilar materials, e.g., iron and constantans. The remaining junction 22 is cool relative to heated junction 20 and, if desired, may remain at a fixed atmospheric temperature. Heating the one junction while the remaining junction is at a cooled or fixed temperature produces a low voltage. Positioned between condenser 23, which is used to store the electrical energy to a sufficient level, and thermopile 21 is an insecticide volatilizing dish 24 which is controllably heated by any suitable means. For example the dish can be heated from the heat emitted from the combustion chamber 19. This heated dish will act as a means for volatilizing common crystalline forms of insecticidal materials which aid in controlling the nocturnal activities of egg laying adult insects. Electrically attached to the remaining end of the condenser is flash tube 25 which will emit an intermittent source of radiant energy.

Positioned about tube 25 is an adjustable light shield 26 which deflects the radiant energy emitted from tube 25 to a desired location in the field of growing crops. In FIGURES 2 and 3 are shown additional embodiments of the radiant energy deflecting means. In FIGURE 2, an umbrella type of deflector 31 is used to deflect radiant energy beams emitted from tube 25 whereas in FIGURE 3, a deflecting shield 32 is coupled to and suspended from the shaft 33 of motor 34. The power required to drive motor 34 can be either a battery means (not shown) which is located on carrier 30 or suitable energy for the motor can be obtained through a connection to condenser 23. Upon activation of motor 34, shaft 33 and the suspended deflector shield 32 are rotated with radiant beams of energy being deflected to different areas of the crop at desired intervals.

The energy value for propane amounts to 19,040 B.t.u.'s per gallon. Based on this figure, and a heat-to-light conversion of approximately 10%, there would be expended about 1.72 gallons of propane per bushel of corn grain produced. The heat-to-light conversion factor used above may vary from about 5% to 30%.

The propane actuated device, preferably located on a portable carrier 30, supplies energy to a flash tube 25 which, in turn, emits intermittent beams of radiant energy to the corn crop. The apparatus has a sufficient fuel supply for supplying the necessary radiant energy output for sereval acres of corn. Operation of the unit occurs from dusk until dawn, approximately 5 to 7 hours, and from the middle of June to about the middle of September, or in the neighborhood of approximately 90 days, assuming corn belt area conditions.

Though propane has been set forth as the preferred fuel to be used in the apparatus for producing a source of radiant energy, other hydrocarbons could also be used.

The radiant energy referred to in this specification is that energy which will allow crops to grow and photosynthesis to occur.

The foregoing detailed description has been given for the purpose of understanding only, and no unnecessary limitations should be understood therefrom, as modifications will be obvious to those skilled in the art.

What is claimed is:

1. An apparatus for the production of a source of intermittent radiant energy for use in crop growing, wherein said apparatus comprises:

bottled fuel means;

combustion means connected to said fuel means for converting chemical energy in said fuel means to heat energy;

a thermopile means connected with said combustion means for converting heat energy to electrical energy;

means for converting said electrical energy into intermittent radiant energy; and, means located adjacent said thermopile for volatilizing crystalline forms of insecticidal materials.

2. An apparatus in accordance with claim 1 further including a support stand for positioning said bottled fuel.

3. An apparatus in accordance with claim 1 further including a condenser means connected to said thermopile means for storing said electrical energy.

4. An apparatus in accordance with claim 1 further including a deflector means attached to said apparatus for deflecting said radiant energy in a particular direction.

5. An apparatus in accordance with claim 4 wherein said deflector means is capable of rotation about said radiant energy means.

References Cited

UNITED STATES PATENTS

| | | | |
|---|---|---|---|
| 1,208,315 | 12/1916 | Hexter et al. | 43—129 |
| 1,954,046 | 4/1934 | Halberstadt | 250—85 |
| 2,081,768 | 5/1937 | Ritter | 43—129 |
| 2,118,145 | 5/1938 | Beyer | 250—85 |
| 2,675,293 | 4/1954 | Baker | 43—129 |
| 2,681,061 | 6/1954 | Modell | 250—85 |
| 2,690,500 | 9/1954 | Winberg | 43—129 |
| 2,742,342 | 4/1956 | Dew et al. | 43—129 |
| 2,799,116 | 7/1957 | Leftwich | 43—113 |
| 3,137,798 | 6/1964 | Noyes et al. | 310—4 |
| 3,238,395 | 1/1966 | Sense | 310—4 |
| 3,243,612 | 3/1966 | Lyczko | 310—4 |
| 3,279,118 | 10/1966 | Allen | 43—129 |

ALDRICH F. MEDBERY, *Primary Examiner.*

SAMUEL KOREN, *Examiner.*